US009292732B2

(12) United States Patent
Ono et al.

(10) Patent No.: US 9,292,732 B2
(45) Date of Patent: Mar. 22, 2016

(54) IMAGE PROCESSING APPARATUS, IMAGE PROCESSING METHOD AND COMPUTER PROGRAM PRODUCT

(71) Applicant: KABUSHIKI KAISHA TOSHIBA, Tokyo (JP)

(72) Inventors: Toshiyuki Ono, Kanagawa (JP); Yasunori Taguchi, Kanagawa (JP); Nobuyuki Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 13/796,095

(22) Filed: Mar. 12, 2013

(65) Prior Publication Data
US 2013/0287292 A1    Oct. 31, 2013

(30) Foreign Application Priority Data

Apr. 27, 2012 (JP) ................................ 2012-102940

(51) Int. Cl.
*G06T 19/20* (2011.01)
*G06K 9/00* (2006.01)
*G06T 5/00* (2006.01)

(52) U.S. Cl.
CPC ........ *G06K 9/00201* (2013.01); *G06K 9/00664* (2013.01); *G06T 5/003* (2013.01); *G06T 2207/10004* (2013.01); *G06T 2207/10028* (2013.01); *G06T 2207/20076* (2013.01); *G06T 2207/20081* (2013.01)

(58) Field of Classification Search
CPC ............................ G06T 7/0008; G06T 7/0075
USPC ........................................................ 382/154
See application file for complete search history.

(56) References Cited

U.S. PATENT DOCUMENTS

| 5,539,523 | A  | * | 7/1996  | Nakai et al. | 358/296 |
| 5,581,370 | A  | * | 12/1996 | Fuss et al.  | 358/447 |
| 6,411,305 | B1 | * | 6/2002  | Chui         | 345/660 |
| 6,504,951 | B1 | * | 1/2003  | Luo et al.   | 382/165 |
| 6,748,119 | B1 | * | 6/2004  | Bollman      | 382/254 |
| 7,010,172 | B1 | * | 3/2006  | Ito          | 382/260 |
| 7,724,980 | B1 | * | 5/2010  | Shenzhi      | 382/263 |

(Continued)

FOREIGN PATENT DOCUMENTS

| JP | 2003-281535 | 10/2003 |
| JP | 2009-251839 | 10/2009 |

OTHER PUBLICATIONS

Ono, T., Taguchi, Y. Matsumoto, N., Kaneko T., Ida, T., Super-resolution with depth-adapted gain control for depth-feel enhancement of landscape image. 2012 IEEE 1st Global Conference on Consumber Electronics. Oct. 2-5, 2012.*

(Continued)

*Primary Examiner* — Kim Vu
*Assistant Examiner* — Molly Delaney
(74) *Attorney, Agent, or Firm* — Nixon & Vanderhye, P.C.

(57) ABSTRACT

According to an embodiment, an image processing apparatus includes an obtaining unit and an image processing unit. The obtaining unit is configured to obtain depth information for each position in an image. The image processing unit is configured to switch between a first sharpening process and a second sharpening process in accordance with whether the image contains a predetermined area. The first sharpening process performs non-uniform sharpening on the image on the basis of the depth information; and the second sharpening process performs uniform sharpening on the image.

21 Claims, 7 Drawing Sheets

(56) References Cited

U.S. PATENT DOCUMENTS

| | | | |
|---|---|---|---|
| 8,059,911 B2* | 11/2011 | Chen et al. | 382/266 |
| 8,212,937 B2* | 7/2012 | Kobayashi | 348/625 |
| 8,213,711 B2* | 7/2012 | Tam et al. | 382/162 |
| 8,260,073 B2* | 9/2012 | Ali | 382/254 |
| 8,335,393 B2* | 12/2012 | Kotani | 382/263 |
| 8,437,572 B2* | 5/2013 | Moesle | 382/263 |
| 8,488,878 B2* | 7/2013 | Yuan et al. | 382/165 |
| 8,593,542 B2* | 11/2013 | Steinberg et al. | 348/239 |
| 8,625,904 B2* | 1/2014 | Das et al. | 382/218 |
| 8,750,566 B2* | 6/2014 | Guan et al. | 382/103 |
| 2002/0171855 A1* | 11/2002 | Edge | 358/1.9 |
| 2004/0075755 A1* | 4/2004 | Rantanen et al. | 348/231.99 |
| 2008/0159644 A1* | 7/2008 | Kelly et al. | 382/261 |
| 2010/0189373 A1* | 7/2010 | Ayzenberg | 382/266 |
| 2011/0249099 A1* | 10/2011 | Vandewalle et al. | 348/47 |
| 2012/0002862 A1* | 1/2012 | Mita | G06K 9/00697 382/154 |
| 2012/0113094 A1* | 5/2012 | Shimoyama et al. | 345/419 |
| 2012/0274634 A1* | 11/2012 | Yamada et al. | 345/419 |
| 2013/0230258 A1* | 9/2013 | Peng et al. | 382/254 |
| 2014/0093159 A1* | 4/2014 | Nguyen et al. | 382/154 |

OTHER PUBLICATIONS

Luft, Thomas, Colditz, Carsten, Deussen, Oliver. "Image Enhancement by Unsharp Masking and Depth Buffer". Association for Computing Machinery. 2006.*

Tseng, Sheng-Po, Lai, Shang-Hong. Accurate Depth Map Estimation From Video via MRF Optimization. Visual Communications and Image Procesing, 2011 IEE. Nov. 6-9, 2011.*

Office Action mailed Jun. 10, 2014 in counterpart Japanese Patent Application No. 2012-102940 and English-language translation thereof.

* cited by examiner

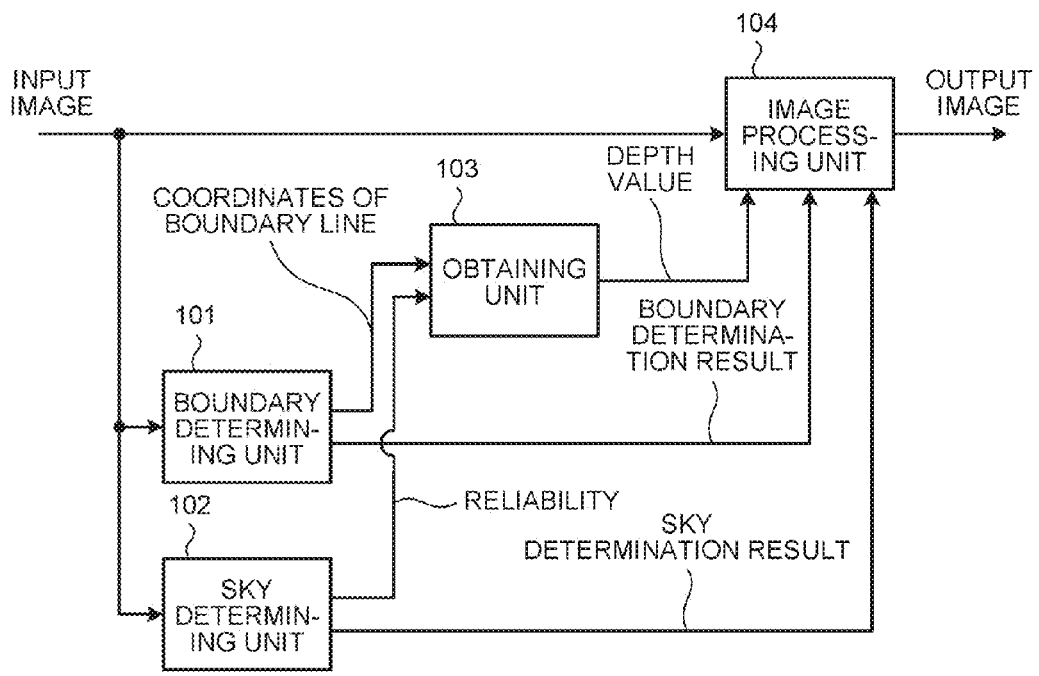
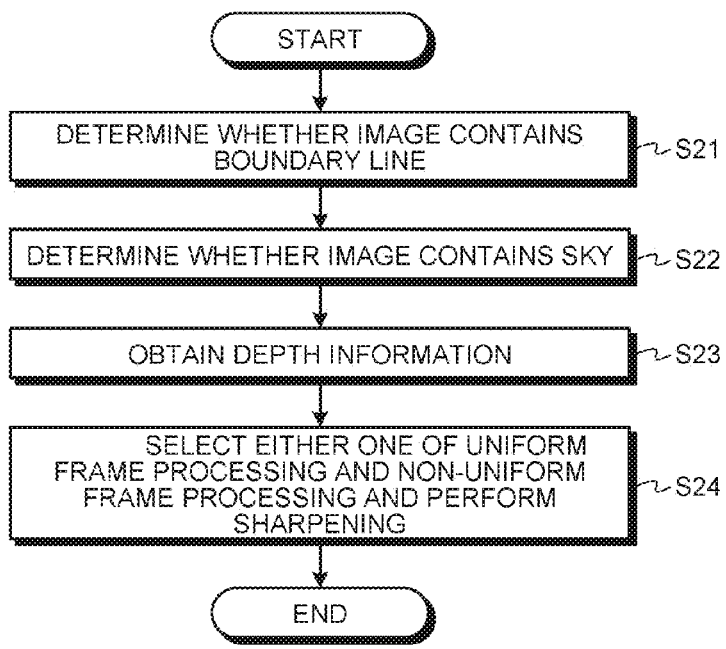

(a)  (b)

IMAGE PROCESSING APPARATUS, IMAGE PROCESSING METHOD AND COMPUTER PROGRAM PRODUCT

CROSS-REFERENCE TO RELATED APPLICATION

This application is based upon and claims the benefit of priority from Japanese Patent Application No. 2012-102940, filed on Apr. 27, 2012; the entire contents of which are incorporated herein by reference.

FIELD

Embodiments described herein relate generally to an image processing apparatus, an image processing method and a computer program product therefor.

BACKGROUND

A technique of calculating the depth of each position in an image and performing image processing on each position according to the calculated depth to improve a sense of depth of the image has been known in related art.

With the technique of the related art, however, the processing for improving the sense of depth is performed on all of positions in an image, which causes a problem that parts for which it is not desired to improve the sense of depth are also processed. In this case, for example, there is a problem that the range of the depth is narrow. There is also a problem, for example, that, when a background of an image taken indoors is smoothed, a sense of sharpness of the image will be lost and the image will be perceived as being deteriorated in image quality.

BRIEF DESCRIPTION OF THE DRAWINGS

FIG. 1 is a block diagram illustrating an image processing apparatus according to an embodiment;

FIG. 2 is a flowchart illustrating image processing according to the embodiment;

DETAILED DESCRIPTION

Figure 3:
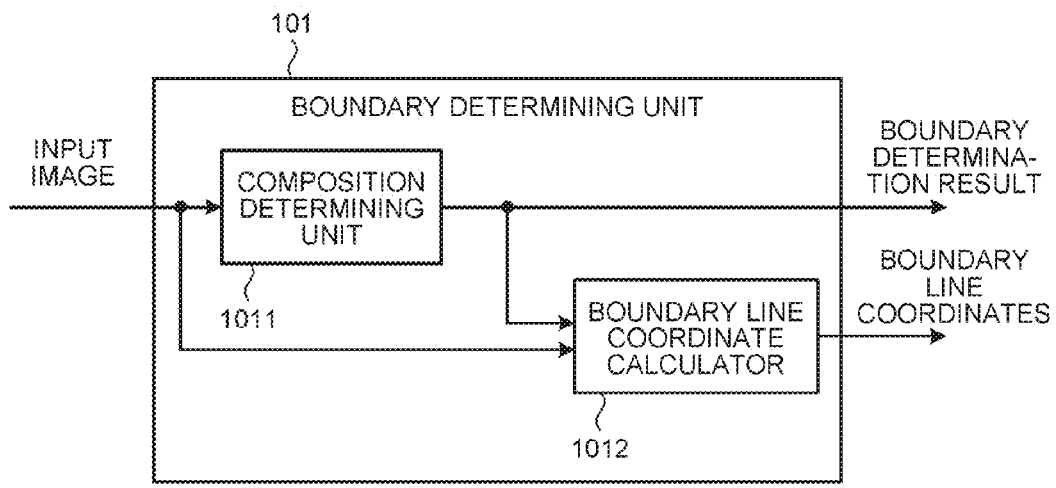
FIG. 3 is a block diagram illustrating a boundary determining unit according to the embodiment.

According to an embodiment, an image processing apparatus includes an obtaining unit and an image processing unit. The obtaining unit is configured to obtain depth information for each position in an image. The image processing unit is configured to switch between a first sharpening process and a second sharpening process in accordance with whether the image contains a predetermined area, the first sharpening process performing non-uniform sharpening on the image on the basis of the depth information, the second sharpening process performing uniform sharpening on the image.

An image processing apparatus according to an embodiment will be described below. FIG. 1 illustrates an image processing apparatus according to the embodiment. The image processing apparatus includes a boundary determining unit 101, a sky determining unit 102, an obtaining unit 103 and an image processing unit 104.

The boundary determining unit 101, the sky determining unit 102, the obtaining unit 103 and the image processing unit 104 can be implemented in a manner that independent pieces of hardware operate in cooperation with one another. Alternatively, some or all of the boundary determining unit 101, the sky determining unit 102, the obtaining unit 103 and the image processing unit 104 may be implemented by software running on a central processing unit (CPU).

The boundary determining unit 101 determines the composition of an input image, and outputs a determination result (a boundary determination result) and coordinate information corresponding to the composition. The sky determining unit 102 determines whether or not the image contains the sky, and outputs a determination result (a sky determination result) and a reliability that is information of there being a sky at each position. The obtaining unit 103 obtains depth information (a depth value) of the input image on the basis of the coordinate information output from the boundary determining unit 101 and the reliability output from the sky determining unit 102.

The reliability and the depth value are calculated for each predetermined unit of an image. In the embodiment, the reliability and the depth value are calculated for each pixel of an image.

The image processing unit 104 performs sharpening on the input image. In this process, the image processing unit 104 determines whether or not the input image contains a predetermined region on the basis of the boundary determination result output from the boundary determining unit 101 and the sky determination result output from the sky determining unit 102. When it is determined that the input image contain the predetermined region, the image processing unit 104 performs non-uniform sharpening on the input image on the basis of the depth value output from the obtaining unit 103.

Overall Flow of Processing

FIG. 2 is a flowchart illustrating image processing in the image processing apparatus according to the embodiment. First, in step S21, the boundary determining unit 101 determines a composition based on an input image. In the embodiment, it is determined whether or not the image contains a boundary line between a region in which the depth continuously changes and a region in which the depth is constant.

Specific examples of the boundary line include the horizon. Thus, when the image is captured by a camera, the depth continuously changes from the side nearer to the camera (the lower side of the image) toward the horizon. The horizon is considered to represent a boundary where the distance from the camera is virtually infinite, and the depth of a part above the horizon in the image is constant. The boundary line is not limited to the horizon, and may include a boundary between a flat surface of the ground and a three-dimensional object, for example.

Next, in step S22, the sky determining unit 102 determines whether or not the input image is an image containing the sky.

In this case, an image containing the sky may contain the cloud. In step S23, the obtaining unit 103 obtains depth information on the basis of the coordinate information of the boundary line output from the boundary determining unit 101 and the reliability representing the sky output from the sky determining unit 102. In this process, the obtaining unit 103 obtains the depth information as a depth value for each predetermined unit in the image.

Next, in step S24, the image processing unit 104 selects whether sharpening on the input image is to be performed at uniform intensity within a frame (uniform frame processing) or at non-uniform intensity within a frame (non-uniform frame processing) on the basis of the boundary determination result output from the boundary determining unit 101 and the sky determination result output from the sky determining unit 102. If non-uniform frame processing is selected, for example, the image processing unit 104 performs sharpening on the input image at non-uniform intensity within a frame on the basis of the depth information output from the obtaining unit 103.

Determination of Boundary Line

Figure 4:
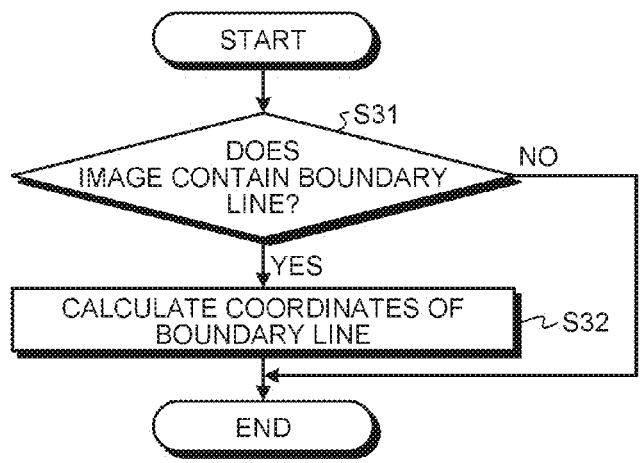
FIG. 4 is a flowchart illustrating operation of the boundary determining unit according to the embodiment.

Next, the determination of the composition in step S21 in the flowchart of FIG. 2 will be described in more detail. FIG. 3 illustrates the boundary determining unit 101 according to the embodiment. FIG. 4 is a flowchart illustrating operation of the boundary determining unit 101. As illustrated in FIG. 3, the boundary determining unit 101 includes a composition determining unit 1011 and a boundary line coordinate calculator 1012.

In the flowchart of FIG. 4, the boundary determining unit 101 determines whether or not the image (input image) to be processed is an image containing a boundary by the composition determining unit 1011 in step S31. The determination result is output as a boundary determination result.

The determination whether or not the image is an image containing a boundary line can be made by a method using a SVM discriminator disclosed in JP-A 2012-015744 (KOKAI), for example. Specifically, in JP-A 2012-015744 (KOKAI), it is determined whether or not an image contains a boundary line by extracting a feature value from the image, and using an SVM (support vector machine) discriminator that has learned using a set of images containing a boundary line and a set of images without a boundary line in advance More specifically, the following processes are performed in advance to perform learning by the SVM discriminator. For example, a composition containing the horizon in an image is assumed. According to the composition, a part below the horizon corresponds to the water surface or the ground and a part above the horizon corresponds to the sky. Areas for calculation are set to upper-left, upper-right, lower-right and lower-left parts of the image in the composition thus assumed, and a statistic value for pixel values such as a color histogram is calculated for each calculation area. Then, a similarity $s_{12}$ between upper-left and upper-right calculation areas, a similarity $s_{24}$ between upper-right and lower-right calculation areas, a similarity $s_{34}$ between lower-right and lower-left calculation areas, and a similarity $s_{13}$ between lower-left and upper-left calculation areas are obtained. A feature vector $v=(s_{12}, s_{13}, s_{24}, s_{34})$ containing the four similarities is generated. This feature vector v is generated for each of a number of sample images and made to be learned by the SVM discriminator that is a two-class discriminator.

The composition determining unit 1011 determines whether or not the input image is an image containing a boundary line by evaluating the feature vector v of the similarities $s_{12}$, $s_{13}$, $s_{24}$ and $s_{34}$ between the upper-left, upper-right, lower-right and lower-left calculation areas in the input image by using the SVM discriminator that has performed the learning.

The method for determining whether or not the input image is an image containing a boundary line is not limited to this method using the SVM discriminator. For example, it is also possible to obtain boundary line coordinates in a manner similar to operation of the boundary line coordinate calculator 1012, which will be described later, and determine that the image is an image containing a boundary line if the maximum value of edge strength of each line calculated in the process of calculating the coordinates exceeds a threshold.

If it is determined in step S31 that the input image is an image containing a boundary line, the boundary determining unit 101 proceeds the processing to step S32. In step S32, the boundary determining unit 101 calculates coordinates of the boundary line from the input image by the boundary line coordinate calculator 1012. The boundary line coordinate calculator 1012 first obtains the edge strength for each of all pixels in the image (input image) to be processed by using an edge detection operator that reacts to a horizontal edge. Next, the boundary line coordinate calculator 1012 adds the edge strengths of the pixels on each horizontal lines of the image to obtain the edge strength of each line. Coordinates of a line with the greatest edge strength are calculated as those of the boundary line.

While the boundary line is assumed to be a horizontal straight line in the embodiment, the boundary line is not limited to this example. For example, it is also possible to calculate an oblique line with the greatest edge strength as the boundary line. In this case, the direction of edge detection by the edge detection operator is changed to an oblique direction, the edge strengths in the oblique direction are obtained, and the obtained edge strengths are added for each oblique direction to determine the boundary line in the oblique direction.

If it is determined in step S31 that the input image does not contain a boundary line, the boundary determining unit 101 makes the processing exit the flowchart of FIG. 4 without performing the calculation of boundary coordinates.

Determination of Sky

Figure 5:
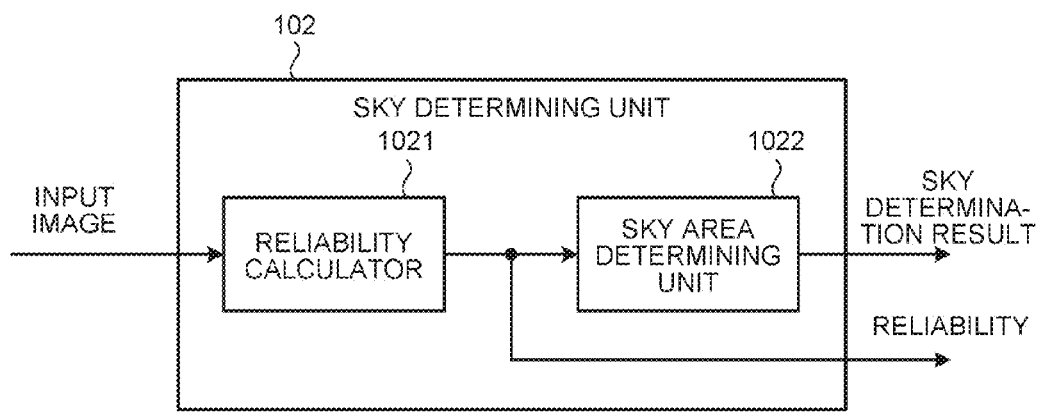
FIG. 5 is a block diagram illustrating a sky determining unit according to the embodiment.
Figure 6:
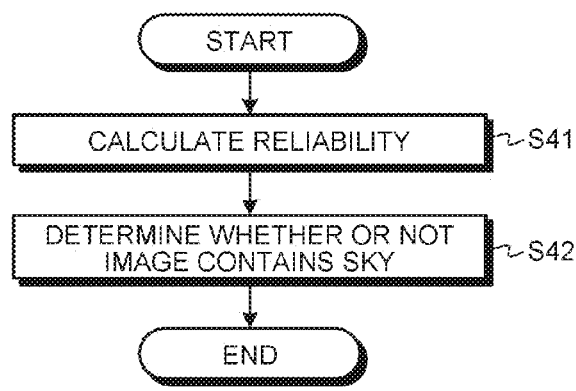
FIG. 6 is a flowchart illustrating operation of the sky determining unit according to the embodiment.

Next, the determination whether the image contains the sky in step S22 of the flowchart of FIG. 2 will be described in more detail. FIG. 5 illustrates the sky determining unit 102 according to the embodiment. FIG. 6 is a flowchart illustrating operation of the sky determining unit 102. As illustrated in FIG. 5, the sky determining unit 102 includes a reliability calculator 1021 and a sky area determining unit 1022.

In the flowchart of FIG. 6, the sky determining unit 102 calculates a value representing a degree in which each pixel of the image (input image) to be processed expresses a sky image by the reliability calculator 1021 in step S41. This value of degree in which a pixel expresses a sky image will be hereinafter referred to as a reliability f. The calculation of the reliability f is performed by using a pixel value and an image feature value extracted from an area therearound and by using the SVM discriminator that has learned in advance.

Figure 7:
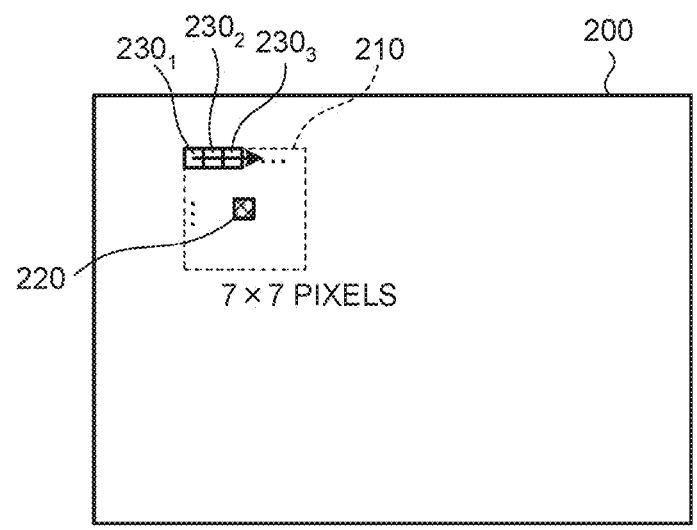
FIG. 7 is a diagram for explaining a method for calculating feature values used for calculation of a reliability f.

The method for calculating feature values to be used for calculation of the reliability f in the embodiment will be described more specifically with reference to FIG. 7. The reliability calculator 1021 sets an area 210 of a predetermined size (7 pixels×7 pixels, for example) around a target pixel 220 in an input image 200. The reliability calculator 1021 calculates differences in pixel values (luminance values Y, for example) between each pixel $230_1$, $230_2$, ... contained in the area 210 and pixels adjacent thereto in the horizontal direction and in the vertical direction, and obtains absolute values of the differences. The reliability calculator 1021 sets the greatest difference absolute value out of the difference absolute values calculated for the pixels $230_1$, $230_2$, . . . in the area 210 as a first feature value of the target pixel 220 in the area 210.

The reliability calculator 1021 further obtains a luminance value Y, chrominance values U and V for the target pixel 220, and uses the obtained values as a second feature value, a third feature value and a fourth feature value, respectively. In the reliability calculator 1021, the first to fourth feature values in advance are learned by the SVM discriminator in advance by using a set of images in which the sky is the subject and a set of images in which the subject is other than the sky.

The reliability calculator 1021 calculates the first to fourth feature values sequentially for each pixel of the input image 200 as the target pixel 220 by using the SVM discriminator that has learned in advance as described above. The reliability calculator 1021 then calculates the reliability by the following Equations (1) and (2) by using a vector x obtained by arranging the first to fourth feature values.

$$f = \frac{1}{1+e^{-2p}} \quad (1)$$

$$p = w^t x + b \quad (2)$$

In Equation (2), the values w and b represent parameters obtained in advance by learning by the SVM discriminator, and are four-dimensional vectors. The symbol t represents a transpose of a vector (matrix). The values w and b are learned in such a manner that the value p≥0 is satisfied for a pixel that expresses the sky. Thus, according to Equation (1), the reliability f≥0.5 is satisfied for a pixel that expresses the sky.

Note that the method for calculating the reliability f is not limited to that using Equation (1). In other words, the reliability f may be calculated in any manner as long as the reliability f monotonically increases in relation to an increase in the value p within a range of 0 to 1.

Moreover, while it is described above that the first to fourth feature values are calculated for each pixel of the input image, the calculation is not limited to this example. For example, the input image may be divided into blocks of a predetermined size and the first to fourth feature values may be obtained for each block. Each block includes a plurality of pixels. The reliability f may then be calculated according to Equations (1) and (2) described above by using the first to fourth feature values for each block, and the calculated reliability f may be used as the reliability f of each pixel included in the block.

Figure 8:
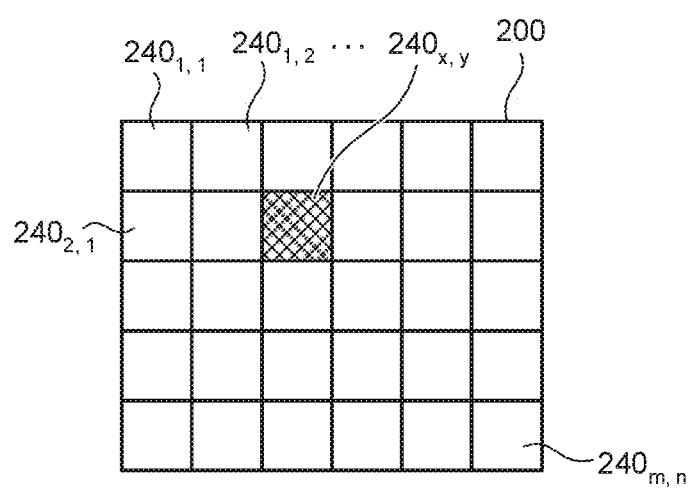
FIG. 8 is a diagram for explaining another method for calculating feature values used for calculation of the reliability f.

More specific description will be given with reference to FIG. 8. As exemplified in FIG. 8, the input image 200 is divided into blocks $240_{1,1}$, $240_{1,2}$, . . . , $240_{x,y}$, . . . , $240_{m,n}$ of a predetermined size each including a plurality of pixels. The reliability calculator 1021 calculates the first to fourth feature values each pixel in the blocks $240_{1,1}$, $240_{1,2}$, . . . , $240_{x,y}$, . . . , $240_{m,n}$ in the same manner as above. The reliability calculator 1021 then obtains values representative of the first to fourth feature values calculated for the pixels in each block $240_{1,1}$, $240_{1,2}$, . . . , $240_{x,y}$, . . . , $240_{m,n}$ as the first to fourth feature values of the block. The reliability f is calculated on the basis of the first to fourth feature values of the block. Respective averages of the first to fourth feature values calculated for the pixels in the block, for example, can be used as the representative values.

Note that an image of the sky in the daytime typically includes a mixture of parts corresponding to the blue sky and parts corresponding to the cloud. The reliability f calculated as described above may be a low value at a boundary between a blue sky part and a cloud part. This is because the first feature value is large at a boundary between a blue sky part and a cloud part. Furthermore, the reliability f may be a low value in an area of the sky because of an influence of noise in the image.

Accordingly, a map having the reliability f as a value of each coordinate (each pixel position) is generated, and the reliability f is corrected on the basis of this map to increase the accuracy of the reliability f at an isolated point existing in a sky area and at a boundary between the blue sky and the cloud in the image. For example, the correction in this case can be performed by applying closing of performing dilation and erosion the same number of times on the image to each reliability f in the map.

If, however, the correction described above is performed on all pixels of the image, the reliability f of an area that does not correspond to the sky may be erroneously corrected to a higher value. It is therefore preferable to determine for each pixel of the image whether or not the subject is a boundary between the blue sky and the cloud and selectively perform the correction described above on pixels determined to correspond to the boundary.

This process of extracting a boundary between the blue sky and the cloud from an image will be described. The reliability calculator 1021 calculates a change in the brightness and a change in the color (blueness) in each of the horizontal direction and the vertical direction for each pixel of an image 300. For the brightness and the blueness, a luminance value Y and a chrominance value U, respectively, among YUV values of an image can be used. The reliability calculator 1021 determines a pixel whose direction of a change in the brightness and direction of a change in the blueness of the color are not coincident as a pixel at a boundary part between the blue sky and the cloud. Specifically, this determination utilize the characteristic that, when a value changes from the blue sky (blue) to the cloud (white), the brightness becomes higher and the blueness becomes lower since the color becomes nearer to an achromatic color.

Figure 9:
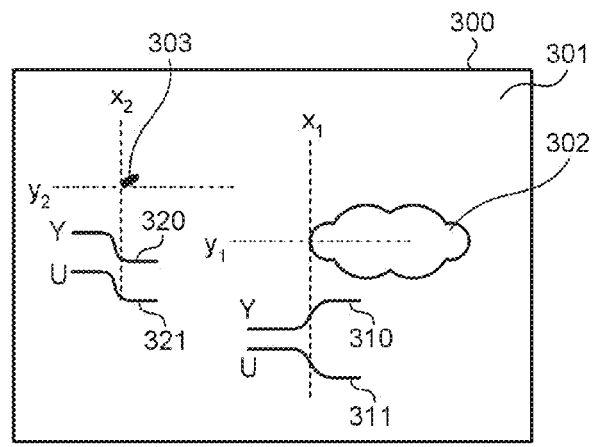
FIG. 9 is a diagram for explaining processing for extracting a boundary between a blue sky and a cloud from an image according to the embodiment.

The process of extracting a boundary between the blue sky and the cloud from an image will be described in more detail with reference to FIG. 9. FIG. 9 illustrates an example in which a white cloud 302 and a black subject 303 exist in a blue sky 301 in the image 300. First, a boundary between the blue sky 301 and the cloud 302 will be considered. For example, a change in the pixel value at a coordinate $y_1$ in the vertical direction from a part of the blue sky 301 toward a part of the cloud 302 in the horizontal direction is checked. In this case, as exemplified by a curve 310, the luminance value Y increases near the coordinates ($x_1$, $y_1$) of the boundary between the blue sky 301 and the cloud 302. In the meantime, the chrominance value U decreases near the coordinates ($x_1$, $y_1$) as exemplified by a curve 311.

Next, a boundary between the blue sky 301 and the black subject 303 will be considered. For example, a change in the pixel value at a coordinate $y_2$ in the vertical direction from a part of the blue sky 301 toward a part of the subject 303 in the horizontal direction is checked. In this case, as exemplified by a curve 320, the luminance value Y decreases near the coordinates ($x_2$, $y_2$) of the boundary between the blue sky 301 and the subject 303. Similarly, the chrominance value Y decreases near the coordinates ($x_2$, $y_2$) as exemplified by a curve 321. Note that the curves 320 and 321 and the curves 310 and 311 described above are illustrated in a manner enlarged in the x direction.

Therefore, for observing changes in the luminance value Y and the chrominance value U in the horizontal direction, for example, a pixel position corresponding to the boundary between the blue sky 301 and the cloud 302 can be obtained by comparing the directions of changes in the luminance value Y and the chrominance value U between positions associated with each other.

More specifically, the determination whether each pixel position is a boundary part between the blue sky 301 and the cloud 302 is performed by observing changes in the luminance value Y and the chrominance value U in each of the horizontal direction and the vertical direction. If both the determination result in the horizontal direction and the determination result in the vertical direction indicate that the pixel position is a boundary between the blue sky 301 and the cloud 302, the pixel position is determined to be the boundary part between the blue sky 301 and the cloud 302.

Furthermore, if an absolute value of a change in at least one of the luminance value Y and the chrominance value U is smaller than a threshold, the pixel position may be subjected to the correction described above.

Note that the method for calculating the reliability f is not limited to the method described above. For example, it is also possible to detect an area in which the pixel values are more flat than those of the boundary line calculated by the boundary line coordinate calculator 1012 described above and obtain an average color of the area. Then, the reliability f can be calculated as being greater as the pixel value of each pixel in the image is nearer to the average color.

Referring back to the explanation of the flowchart in FIG. 6, when the reliability f is calculated as described above in step S41, the processing is moved to step S42. In step S42, the sky area determining unit 1022 determines whether or not the image to be processed is an image containing the sky by using the value of the reliability f. In the embodiment, this determination is made on the basis of whether the sky area in the image is larger than a predetermined area (area ratio).

More specifically, the sky area determining unit 1022 obtains the number of pixels with the reliability f being a predetermined value or larger (f≥0.5 in this example) in the image. The sky area determining unit 1022 determines an image in which the ratio of this number of pixels to the total number of pixels in the image is a predetermined ratio or higher to be an image containing the sky.

Obtainment of Depth Value

Next, a process of obtaining a depth value in step S23 of the flowchart in FIG. 2 will be described in detail. The obtaining unit 103 obtains depth information at each position of the image to be processed. More specifically, the obtaining unit 103 obtains a depth value D(x, y) for each pixel by the following Equation (3) using a coordinate $y_{border}$ of the boundary line obtained by the boundary determining unit 101 and the reliability f(x, y) for each pixel obtained by the sky determining unit 102.

$$D(x, y) = \begin{cases} z(1 - f(x, y)) & \text{if } y < y_{border} \\ z + \alpha(y - y_{border}) & \text{otherwise} \end{cases} \quad (3)$$

In Equation (3), (x, y) is an index that specify coordinates of data in the horizontal direction and the vertical direction and corresponds to each pixel position in the image to be processed, for example. In this case, it is assumed that the coordinate y in the vertical direction increases from the upper end toward the lower end of the image and the coordinate x in the horizontal direction increases from the left end toward the right end of the image. The values z and α are predetermined positive constants.

The upper part of Equation (3) corresponds to the area above the boundary line in the image. The lower part of Equation (3) corresponds to the area below the boundary line. Note that the distance from the camera (point of view) to the subject is shorter (the depth is smaller) as the depth value D is larger.

Figure 10:
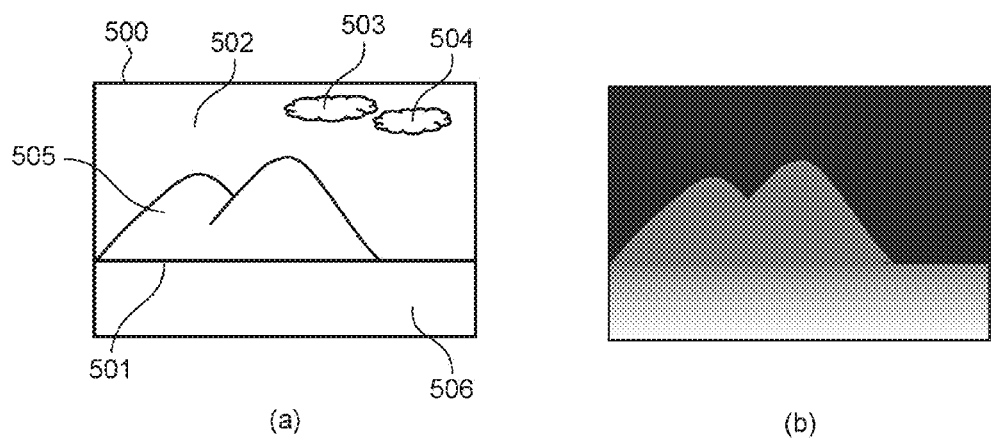
FIG. 10 illustrates diagrams for explaining a method for calculating a depth value D according to the embodiment.

An example of a method for calculating the depth value D will be described with reference to FIG. 10. Illustrated in (a) of FIG. 10 is an example of an input image 500 to be processed. In this example, the input image 500 contains images of a blue sky 502, clouds 503 and 504, a distant mountain 505 and a ground 506. Schematically illustrated in (b) of FIG. 10 is the depth value D corresponding to the image of (a) of FIG. 10. In (b) of FIG. 10, the depth value D is expressed by the depth of color, and a smaller depth value D is expressed by a deeper color.

When the input image 500 is input to the image processing apparatus, the boundary determining unit 101 calculates a boundary line 501. In addition, the sky determining unit 102 calculates the reliability f for each position of the input image 500. It is assumed here that the reliability f is calculated to be high for the blue sky 502 and the clouds 503 and 504 and that the reliability f of the others (the mountain 505 and the ground 506) is calculated to be low. As an example, it is assumed that the reliability f is 1 for the blue sky 502 and the clouds 503 and 504 and that the reliability f is 0 for the mountain 505 and the ground 506.

The obtaining unit 103 assigns these values of the reliability f in Equation (3) to calculate the depth value D for each position in the input image 500. Since the areas of the blue sky 502 and the clouds 503 and 504 are areas where the reliability f is 1 and areas above the boundary line 501, the upper part of Equation (3) is relevant, and the depth value D=0 is obtained. Similarly, since the mountain 505 that is an area above the boundary line 501 is an area where the reliability f is 0, the depth value D=z is obtained. Furthermore, for the ground 506 that is an area below the boundary line 501, the lower part of Equation (3) is relevant, and the depth value D monotonically increases from the value z from the upper part to the lower part according to the coordinate y in the vertical direction regardless of the reliability f.

Schematically illustrated in (b) of FIG. 10 is distribution of the depth value D in the image thus obtained in association with the color depth. Specifically, in (b) of FIG. 10, a part in a deeper color represents a part of a greater depth, and the areas of the blue sky 502 and the clouds 503 and 504 where the depth value D is 0 are filled with the deepest color. The part of the mountain 505 where the depth value D is z is filled with an intermediate color. Furthermore, the ground 506 is illustrated as a gradation continuously changing from an intermediate color toward white from the height of the boundary line 501 toward the lowermost end of the input image 500, which means that the depth continuously changes.

Note that the equation for calculating the depth value D is not limited to that of Equation (3) described above. For example, the depth value D may be set to a predetermined value equal to or larger than 0 when the reliability f is 1. In this case, it is preferable that the depth value D monotonically increase with an increase in the coordinate y when the reliability f is 0 at all coordinates.

Furthermore, the depth value D(x, y) may be corrected to be greater as the reliability f is smaller. For example, the depth value D is calculated by the following Equation (4) using a correction value g and a positive constant β that controls the correction value g.

$$D(x, y) = \begin{cases} z(1 - f(x, y)) + \beta g(x, y) & \text{if } y < y_{border} \\ z + \alpha(y - y_{border}) + \beta g(x, y) & \text{otherwise} \end{cases} \quad (4)$$

In Equation (4), the correction value g can be calculated by the following Equation (5).

$$g(x,y)=1-f(x,y) \quad (5)$$

Alternatively, the correction value g may be calculated by the following Equation (6) by using the value p in Equation (2) described above. In Equation (6), the value σ is a positive constant. As the value σ is larger, the correction value g becomes larger only for a pixel that is less likely to correspond to the sky.

$$g(x, y) = \frac{1}{1 + e^{2(p(x,y)+\sigma)}} \quad (6)$$

The correction value g is not limited to that obtained by using Equation (5) or Equation (6) described above. Specifically, the correction value g may be a larger value as the reliability f is smaller. For example, the color of a subject in a distant view may become closer to that of the sky and the reliability f thereof may become larger if the subject is hazy or the like. A small reliability f means that the subject is present nearby. Accordingly, the depth value D can be corrected by the correction described above.

Figure 11:
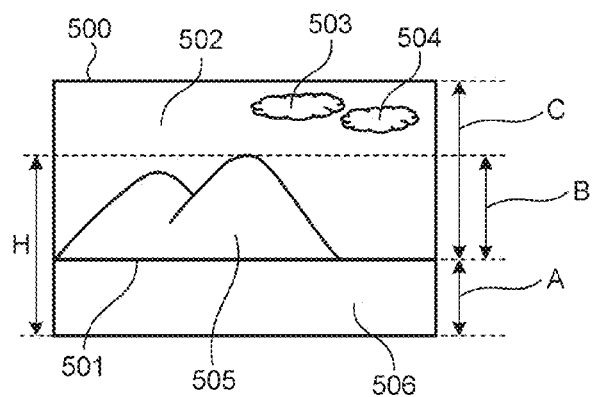
FIG. 11 is a diagram for explaining determination of a value z according to the embodiment.

It is also possible to adaptively changing the value z in Equation (3) or Equation (4) depending on the image to be processed. The process of determining the value z will be described with reference to FIG. 11. FIG. 11 is a schematic diagram of a case in which the input image 500 in (a) of FIG. 10 is processed. In FIG. 11, parts that are the same as those in (a) of FIG. 10 will be designated by the same reference numerals and detailed description thereof will not be repeated.

First, the obtaining unit 103 calculates the height H of the image above which the reliability f becomes only a value equal to or larger than a threshold. This height H refers to a height of a subject that is not the sky. Next, a height A below the boundary line 501, a height C above the boundary line 501 and a height B between the height A of the boundary line 501 and the height H. Next, a numerical value R for controlling the value z is calculated by the following Equation (7).

$$R=R_1+R_2 \quad (7)$$

In Equation (7), the values $R_1$ and $R_2$ are obtained by the following Equations (8) and (9), respectively. In Equation (8), the function clip( ) returns 0 when the argument is 0 or smaller, returns 1 when the argument is 1 or larger, and returns a value equal to the argument when the argument is larger than 0 and smaller than 1. The value h is the height of the input image 500.

$$R_1=\text{clip}((0.75-A/h)/0.5) \quad (8)$$

$$R_2=B/C \quad (9)$$

The value $R_1$ is a value relating to the height A of the boundary line 501 and satisfies $0 \leq R_1 \leq 1$. As the boundary line 501 is positioned lower in the image, the target subject is considered to be positioned higher above the boundary line 501 in the image and to be often present nearer. Accordingly, as the height A of the boundary line 501 becomes lower, the value $R_1$ is a larger value according to Equation (8). Note that, in Equation (8), 0.75 and 0.5 are constants that are experimentally determined, and the values are not limited thereto.

The value $R_2$ represents a ratio of the height occupied by the subject above the boundary line 501 and other than the sky, and satisfies $0 \leq R_2 \leq 1$. Specifically, as the ratio of the height occupied by the subject other than the sky in an area above the boundary line 501 is larger, the subject is considered to be present nearer. Accordingly, as the height B becomes higher, the value $R_2$ is a larger value according to Equation (9).

The value R calculated by Equations (7) to (9) as described above is a value that is larger as the subject (the mountain 505 in the example of FIG. 11) that is other than the sky and above the boundary line 501 is closer in distance. The value z is calculated to be larger as the value R thus calculated is larger. As a result of adaptively determining the value z according to the image as described above, the depth value D of the subject above the boundary line 501 can be set to correspond to the actual depth thereof with more accuracy. As a result of calculating the depth value D on the basis of the composition of the image as in the method described above, a stable depth value D that is less likely to be reversed in relation with those of other parts in the composition can be obtained.

Note that the method for obtaining the depth information by the obtaining unit 103 is not limited to that described above. For example, when the input image is a stereo image, the obtaining unit 103 can obtain the depth information from the parallax amount thereof.

Alternatively, the obtaining unit 103 may obtain the depth information measured by using a separate distance measuring sensor instead of obtaining the depth information from an image to be processed. For example, the distance of each position within a capturing range is measured by using the distance measuring sensor when the input image is captured or the like, information representing the measured distance is associated with the coordinates of the capturing range (coordinates of the input image) and input to the obtaining unit 103 together with the input image. When the method of determining the depth information from the measured value of the distance, the output of coordinates of the boundary line from the boundary determining unit 101 and the output of the reliability f from the sky determining unit 102 become unnecessary.

Note that the obtaining unit 103 can also obtain a depth value of a position where the reliability f is high on the basis of depth information obtained by various methods and correct the depth value to a value representing a deeper depth as the depth information.

Sharpening Process

Next, the process of sharpening the input image in step S24 of the flowchart of FIG. 2 will be described in more detail. The image processing unit 104 performs uniform or non-uniform sharpening within a frame of the input image on the basis of the depth value D output from the obtaining unit 103 and the boundary determination result and the sky determination result output from the boundary determining unit 101 and the sky determining unit 102, respectively.

Figure 12:
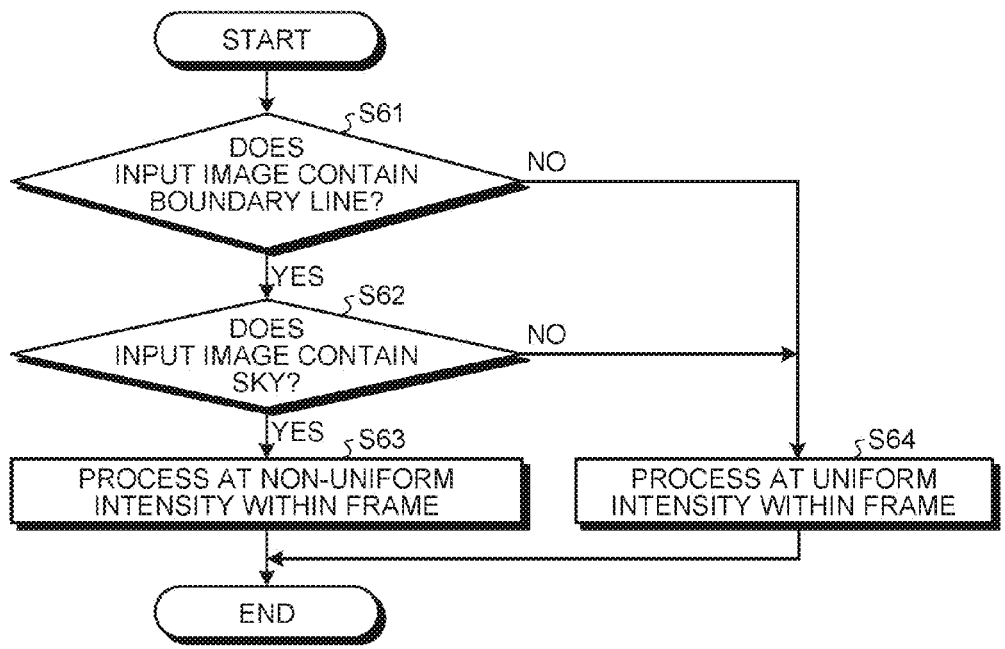
FIG. 12 is a flowchart illustrating a sharpening process according to the embodiment.

FIG. 12 is a flowchart illustrating the sharpening process performed by the image processing unit 104 according to the embodiment. First, in step S61, the image processing unit 104 determines whether or not the input image contains a boundary on the basis of the boundary determination result output from the boundary determining unit 101. If it is determined that the input image does not contain the boundary line, the image processing unit 104 proceeds the processing to step S64 and performs sharpening of the input image at uniform intensity within a frame.

If, on the other hand, it is determined in step S61 that the input image contains the boundary line, the image processing unit 104 proceeds the processing to step S62. In step S62, the image processing unit 104 determines whether or not the input image contains the sky on the basis of the sky determination result output from the sky determining unit 102. If it is determined that the input image does not contain the sky, the image processing unit 104 proceeds the processing to step S64.

If, on the other hand, it is determined in step S62 that the input image contains the sky, the image processing unit 104 proceeds the processing to step S63. The image processing unit 104 performs sharpening of the input image at non-uniform intensity within a frame in step S63.

Note that, in the flowchart of FIG. 12, it is also possible to start the processing from step S62 without performing the determination whether or not a boundary line is contained in step S61, and determine whether to proceed the processing to the process of step S63 or to the process of step S64. In this case, when the processing is proceeded to step S24 in the flowchart of FIG. 2, the image processing unit 104 first determines whether or not the input image contains the sky in step S62 in the flowchart of FIG. 12. The image processing unit 104 performs non-uniform sharpening within a frame (step S63) if the input image is an image containing the sky or performs uniform sharpening within a frame (step S64) if the input image is not an image containing the sky.

The non-uniform sharpening in step S63 in the flowchart of FIG. 12 will be described in more detail. In step S63, sharpening is performed at non-uniform intensity within a frame of the input image by using the depth value D of each coordinate (each pixel) calculated by the obtaining unit 103 as described above. First, the image processing unit 104 converts the depth value D to an intensity λ representing an intensity of image processing. The image processing unit 104 converts the depth value D to the intensity λ by using the following Equation (10), for example. In Equation (10), the value γ is a positive constant.

$$\lambda(x,y)=\gamma D(x,y) \tag{10}$$

According to Equation (10), the value of the intensity λ is larger as the depth value D is larger. The relation is not limited to this example, and the intensity λ may be larger as the depth value D is closer to a predetermined value, for example. Alternatively, a table storing association between the depth value D and the intensity λ may be prepared in advance, and the image processing unit 104 may obtain an intensity λ associated with the obtained depth value D.

Subsequently, the image processing unit 104 performs sharpening of the input image on the basis of the intensity λ obtained by Equation (10). The sharpening process may include unsharp masking of enhancing colors and contrast at an image contour of an original image on the basis of a difference between the original image and an image obtained by blurring the original image, for example. For example, the image processing unit 104 performs unsharp masking on an input image I according to the following Equation (11) to obtain a sharpened output image I'. In Equation (11), the value F represents an image obtained by applying a low-pass filter to the input image I.

$$I'(x,y)=I(x,y)+\lambda(x,y)\{I(x,y)-F(x,y)\} \tag{11}$$

As described in Equation (10), the intensity λ is a value proportional to the depth value D obtained for each pixel of the input image I. Accordingly, the output image I' is obtained by performing unsharp masking at non-uniform intensity within a frame according to the depth value D of each pixel of the input image I.

Note that the non-uniform sharpening on the input image is not limited to the method described above. For example, the image processing unit 104 may generate an image obtained by performing sharpening at uniform intensity within a frame of the input image by another sharpening method, and α-blend the generated image and the input image according to the value of the intensity λ to obtain a sharpened output image.

The image processing unit 104 may perform an image magnification process in addition to the sharpening process. When a super resolution method is used for the image magnification, the image processing unit 104 performs processing according to the following procedures, for example. It is assumed that the image processing apparatus processes a moving image. In this case, the image processing unit 104 includes a frame buffer, and an input image at a previous time to be used for processing is held in the frame buffer. Next, various super resolution methods are used to calculate an image S that is a result of super resolution process from an input image of current time and the input image of the previous time. The back projection method, for example, can be applied to the super resolution method. Subsequently, the image processing unit 104 magnifies the intensity λ so that the same resolution as the image S is obtained to obtain an intensity λ'. The magnification of the intensity λ can be performed by using bilinear interpolation, for example.

The image processing unit 104 obtains an output image J' by the following Equation (12) by using the magnified intensity λ'. In Equation (12), the value J represents an image obtained by magnifying the input image by using bilinear interpolation so that the same resolution as the image S is obtained.

$$J'(x,y)=J(x,y)+\lambda'(x,y)\{S(x,y)-J(x,y)\} \tag{12}$$

The uniform sharpening in step S64 in the flowchart of FIG. 12 will be described in more detail. In step S64, the image processing unit 104 performs unsharp masking on the input image I according to the following Equation (13), for example, so as to perform sharpening at uniform intensity within a frame of the input image I to obtain an output image I'.

$$I'(x,y)=I(x,y)+\mu\{I(x,y)-F(x,y)\} \tag{13}$$

In Equation (13), the value μ is a positive constant. Note that the value μ may be set to any positive value. In this case, it is preferable that the value μ be determined according to the range of the intensity α so that the difference from the processing intensity in step S64 described above becomes a predetermined value or smaller. For example, the value μ may be the greatest value or an intermediate value in the range of the intensity λ.

When the image processing unit 104 performs image magnification in addition to sharpening, the image S that is a result of super resolution process is calculated in the same manner as the method described in step S63 described above, and an output image J' is obtained according to the following Equation (14).

$$J'(x,y)=J(x,y)+\mu\{S(x,y)-J(x,y)\} \tag{14}$$

As described above, with the image processing apparatus according to the embodiment, when an input image contains a predetermined image, the sharpening on the input image is switched between processing at non-uniform intensity within a frame and processing at uniform intensity within a frame.

When the predetermined image is an image containing a boundary line and the sky, the image containing the boundary line and the sky is considered to be an image such as a scenery image obtained by capturing a range of great depth containing a distant view outdoors. When perception of a difference in depth between a distant view and a short-range view in such a predetermined image is improved, that is, a sense of depth is improved, the effect of higher image quality can be achieved.

In general, it is difficult to estimate an absolute depth of a subject from local information of an image. In contrast, in the embodiment, there is an advantage that it is possible to estimate whether or not an image is obtained by capturing a range of great depth by estimating the depth from the composition of the image.

As described above, with the image processing apparatus according to the embodiment, it is possible to selectively process an image for which it is desired to improve the sense of depth so that the sense of depth will be improved. On the other hand, for an image such as an image taken indoors for which it is not desired to improve the sense of depth, the entire frame can be sharpened to obtain a high quality image. As described above, with the image processing apparatus according to the embodiment, it is possible to perform processing for improving the sense of depth of an image more appropriately.

The image processing apparatus according to the embodiment can achieve higher quality by improving the sense of depth equally whether a still image or a moving image is input as the input image. While it is described above that the sky determining unit 102 determines a blue sky, the determination is not limited to this example, and a reddish sky of sunset or the lime may be determined. In this case, it is possible to obtain the color shade of the entire image or a predetermined area therein, for example, and determine the image to correspond to a blue sky if the blueness is high, a sunset if the redness is high, or the like on the basis of the obtained color shade. When an image is determined to be a sunset, it can be considered to use the chrominance value V instead of the chrominance value U for determination the reliability f of a boundary with a cloud.

OTHER EMBODIMENTS

Figure 13:
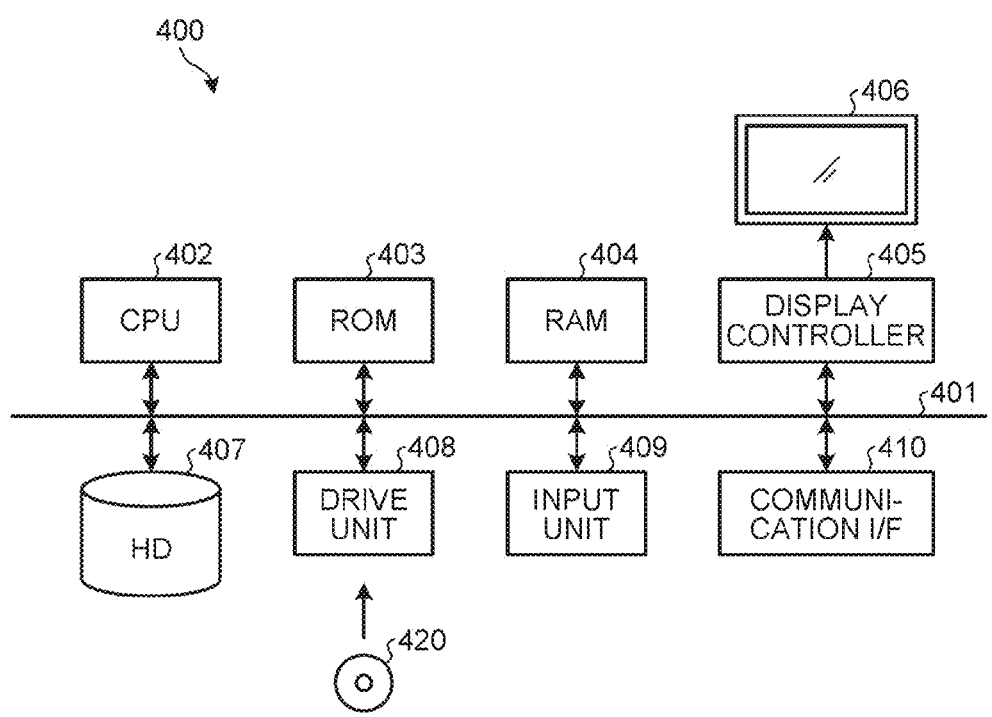
FIG. 13 is a block diagram illustrating a computer system to which the embodiment can be applied.

The image processing apparatus according to the embodiment described above can be implemented by a general-purpose computer used as basic hardware. FIG. 13 is a block diagram illustrating a computer system 400 to which the embodiment described above can be applied.

In the computer system 400 illustrated in FIG. 13, a CPU 402, a read only memory (ROM) 403, a random access memory (RAM) 404 and a display controller 405 are connected to a bus 401. In addition, a hard disk 407, a drive unit 408, an input unit 409 and a communication interface (I/F) 410 are connected to the bus 401.

The CPU 402 controls the entire computer system 400 using the RAM 404 as a working memory according to programs stored in the ROM 403 and the hard disk 407. The display controller 405 converts a display control signal generated by the CPU 402 to a signal that can be displayed by a display device 406.

The hard disk 407 has stored therein programs to be executed by the CPU 402 described above, image data to be the input image and other data. A removable storage medium 420 can be inserted into the drive unit 408, and the drive unit 408 can read/write data from/into the storage medium 420. Examples of the storage medium 420 that is supported by the drive unit 408 includes a disk storage medium such as a compact disk (CD) and a digital versatile disk (DVD) and a nonvolatile semiconductor memory.

The input unit 409 inputs data from outside. For example, the input unit 409 has a predetermined interface such as the universal serial bus (USB) or the Institute of Electrical and Electronics Engineers (IEEE) 1394, and input data from other devices via the interface. The image data of input image can be input through the input unit 409.

In addition, an input device such as a keyboard and a mouse is connected to the input unit 409. The user can operate the input device according to a display on the display device 406, for example to make instruction to the computer system 400.

The communication I/F 410 performs communication with external communication network by using predetermined protocols. The image data of the input image may be supplied from an external communication network via the communication I/F 410.

The boundary determining unit 101, the sky determining unit 102, the obtaining unit 103 and the image processing unit 104 described above are implemented by image processing programs running on the CPU 402. Image processing programs for performing image processing according to the embodiment are recorded on the computer readable storage medium 420 such as a CD and a DVD in a form of a file that can be installed or executed, and provided therefrom as a computer program product. Alternatively, the image processing programs may be stored in the ROM 403 in advance and provided therefrom as a computer program product.

Still alternatively, the image processing programs for performing the image processing according to the embodiment may be stored on a computer system connected to a communication network such as the Internet, and provided by being downloaded via the communication network. Still alternatively, the image processing programs for performing the image processing according to the embodiment may be provided or distributed through a communication network such as the Internet.

The image processing programs for performing the image processing according to the embodiment have a modular structure including the respective units (the boundary determining unit 101, the sky determining unit 102, the obtaining unit 103 and the image processing unit 104) described above, for example. In an actual hardware configuration, the CPU 402 reads the image processing programs from the hard disk 407, for example, and executes the programs, whereby the respective units described above are loaded on a main storage device (such as the RAM 404) and generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
  circuitry that performs at least:
    obtaining depth information for each position in an entire image within a frame; and
    switching between a first sharpening process and a second sharpening process in accordance with whether the image contains a predetermined area, the first sharpening process performing non-uniform sharpening on the entire image including the predetermined area and any area other than the predetermined area on the basis of the depth information, the second sharpening process performing uniform sharpening on the entire image including the predetermined area and any area other than the predetermined area.

2. The apparatus according to claim 1, wherein the circuitry further performs determining whether the image contains a sky, wherein
the first sharpening process is performed on the entire image including an area of the sky and any area other than the area of the sky when the image is determined to contain the sky.

3. The apparatus according to claim 2, wherein the circuitry further performs determining whether the image contains a boundary line between an area whose depth continuously changes and an area whose depth is constant, wherein
the first sharpening process is performed on the entire image including the area of the sky and any area other than the area of the sky when the image is determined to contain the sky and the image is determined to contain the boundary line.

4. The apparatus according to claim 2, wherein the circuitry further performs:
calculating a reliability of there being sky at each position in the image, and
generating the depth information on the basis of the reliability.

5. The apparatus according to claim 4, wherein the circuitry further performs:
calculating a position of the boundary line, and
generating the depth information on the basis of the reliability and the position of the boundary line.

6. The apparatus according to claim 5, wherein the circuitry further performs setting a value representing the depth information at a position above the boundary line to a value closer to a value representing a greater depth as the reliability is higher using a reference value as a reference.

7. The apparatus according to claim 5, wherein the circuitry further performs setting a value representing the depth information for each position of the image to a value closer to a value representing a smaller depth as the reliability is lower.

8. The apparatus according to claim 6, wherein the circuitry further performs setting a value representing the depth information for each position of the image to a value closer to a value representing a smaller depth as the reliability is lower.

9. The apparatus according to claim 6, wherein the circuitry further performs obtaining the reference value from the position of the boundary line and the reliability.

10. The apparatus according to claim 4, wherein the circuitry further performs correcting the reliability by applying a closing process to the reliability for each position in the image.

11. The apparatus according to claim 10, wherein the circuitry further performs correction for a position in the image at which a direction of change in brightness and a direction of change in blueness are not coincident.

12. The apparatus according to claim 1, wherein the circuitry further performs setting a degree of the first sharpening process to be higher as a depth represented by the depth information is smaller.

13. The apparatus according to claim 1, wherein the circuitry further performs a magnification process on the entire image.

14. An image processing method comprising:
obtaining depth information for each position in an entire image within a frame; and
switching between a first sharpening process and a second sharpening process in accordance with whether the image contains a predetermined area, the first sharpening process performing non-uniform sharpening on the entire image including the predetermined area and any area other than the predetermined area on the basis of the depth information, the second sharpening process performing uniform sharpening on the entire image including the predetermined area and any area other than the predetermined area.

15. The method according to claim 14, further comprising:
determining whether the image contains a sky, wherein
when the image is determined to contain the sky, the first sharpening process is performed on the entire image including an area of the sky and any area other than the area of the sky.

16. The method according to claim 15, further comprising:
determining whether the image contains a boundary line between an area whose depth continuously changes and an area whose depth is constant, wherein
when the image is determined to contain the sky and the boundary line, the first sharpening process is performed on the entire image including the area of the sky and any area other than the area of the sky.

17. A computer program product comprising a non-transitory computer-readable storage medium containing a program executed by a computer, the program causing the computer to execute at least:
obtaining depth information for each position in an entire image within a frame; and
switching between a first sharpening process and a second sharpening process in accordance with whether the image contains a predetermined area, the first sharpening process performing non-uniform sharpening on the entire image including the predetermined area and any area other than the predetermined area on the basis of the depth information, the second sharpening process performing uniform sharpening on the entire image including the predetermined area and any area other than the predetermined area.

18. The computer program product according to claim 17, wherein the program further causes the computer to execute:
determining whether the image contains a sky, wherein
when the image is determined to contain the sky, the first sharpening process is performed on the entire image including an area of the sky and any area other than the area of the sky.

19. The computer program product according to claim 18, wherein the program further causes the computer to execute:
determining whether the image contains a boundary line between an area whose depth continuously changes and an area whose depth is constant, wherein
when the image is determined to contain the sky and the boundary line, the first sharpening process is performed on the entire image including the area of the sky and any area other than the area of the sky.

20. The apparatus according to claim 1, wherein the second sharpening process performs the uniform sharpening on the entire image including the predetermined area and any area other than the predetermined area regardless of the depth information.

21. The apparatus according to claim 1, wherein
when the image contains the predetermined area, the first sharpening process is performed on the entire image, and when the image does not contain the predetermined area, the second sharpening process is performed on the entire image.

* * * * *